US011905916B1

(12) United States Patent
Cao et al.

(10) Patent No.: US 11,905,916 B1
(45) Date of Patent: Feb. 20, 2024

(54) TURBOCHARGER AIR INTAKE SILENCER WITH ADJUSTABLE CAVITY SPACE STRUCTURE

(71) Applicant: HARBIN ENGINEERING UNIVERSITY, Harbin (CN)

(72) Inventors: Yipeng Cao, Harbin (CN); Zequn Ma, Harbin (CN); Chen Liu, Harbin (CN); Runze Zhang, Harbin (CN); Xinyu Zhang, Harbin (CN); Wenping Zhang, Harbin (CN); Zhuoyan Feng, Harbin (CN); Yuan Gao, Harbin (CN); Xiaochen Zhao, Harbin (CN); Gongmin Liu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/363,352

(22) Filed: Aug. 1, 2023

(30) Foreign Application Priority Data

Aug. 2, 2022 (CN) .......................... 202210920773.6

(51) Int. Cl.
*F02M 35/12* (2006.01)

(52) U.S. Cl.
CPC .... *F02M 35/1261* (2013.01); *F02M 35/1288* (2013.01)

(58) Field of Classification Search
CPC ........... F02M 35/1222; F02M 35/1261; F02M 35/1288
See application file for complete search history.

(56) References Cited

U.S. PATENT DOCUMENTS

| 5,787,852 | A | * | 8/1998 | Muramatsu | ......... F02B 27/0215 123/184.55 |
| 7,584,821 | B2 | * | 9/2009 | Prior | .................. F02M 35/1266 181/266 |
| 7,690,478 | B2 | * | 4/2010 | Kostun | .............. F02M 35/1255 181/241 |
| 8,316,813 | B2 | * | 11/2012 | Prior | .................. F02M 35/1255 123/184.53 |
| 2005/0252716 | A1 | * | 11/2005 | Moenssen | .......... F02M 35/1266 181/219 |

(Continued)

FOREIGN PATENT DOCUMENTS

| CN | 104989494 A | * | 10/2015 |
| CN | 106640277 A | * | 5/2017 |

(Continued)

*Primary Examiner* — Jeremy A Luks

(57) ABSTRACT

A turbocharger air intake silencer with adjustable cavity space structures is provided. The turbocharger air intake silencer comprises a silencer connecting flange and a first resonator device. The first resonator device comprises a first silencer sealing plate, a first annular sound absorption cavity body, a first rotary table, a first rotary steering gear and a first valve. A first sound absorption cavity is enclosed by the first silencer sealing plate, the first annular sound absorption cavity body, the first valve and the first rotary table. A first sound absorption cavity inlet pipe is arranged beside the first sound absorption cavity. The first sound absorption cavity and the first sound absorption cavity inlet pipe form a Helmholtz resonator. The first rotary steering gear is mounted on the silencer connecting flange. The rotary steering gear is connected with a first rotary rack.

9 Claims, 5 Drawing Sheets

(56) References Cited

U.S. PATENT DOCUMENTS

2018/0163676 A1* 6/2018 Tucker ................. F02M 35/125

FOREIGN PATENT DOCUMENTS

| CN | 207989259 U | * | 10/2018 | |
|---|---|---|---|---|
| CN | 110322868 A | * | 10/2019 | |
| CN | 111322276 A | * | 6/2020 | |
| CN | 111828131 A | * | 10/2020 | |
| DE | 19943246 A1 | * | 3/2001 | ......... F02M 35/1216 |

* cited by examiner

TURBOCHARGER AIR INTAKE SILENCER WITH ADJUSTABLE CAVITY SPACE STRUCTURE

CROSS-REFERENCE TO RELATED APPLICATION

This patent application claims the benefit and priority of Chinese Patent Application No. 2022109207736 filed with the China National Intellectual Property Administration on Aug. 2, 2022, the disclosure of which is incorporated by reference herein in its entirety as part of the present application.

TECHNICAL FIELD

The present disclosure relates to a silencer, in particular to a turbocharger silencer.

BACKGROUND

The turbocharger is widely used in the power system of automobiles and ships, so that the power and economy of the engine can be improved, and exhaust emissions and noise are reduced. However, aerodynamic noise of the turbocharger is also one of main noise sources of the engine. The aerodynamic noise of the turbocharger mainly comes from the compressor. The aerodynamic noise of the compressor is composed of discrete tonal noise and broadband noise. The overall sound pressure level is determined by the discrete tonal noise. The overall radiation noise level of the engine can be effectively controlled by reducing the aerodynamic noise of the turbocharger.

At present, the commonly used silencer mainly includes a Helmholtz resonator, an expansion cavity silencer, a quarter-wave tube and the like. However, the silencer has a disadvantage, that is, the targeted linear spectrum frequencies are mostly fixed, and the corresponding noise frequencies are changeable due to the different rotating speeds of the turbocharger under different working conditions. The silencer cannot cope with the noise of different frequencies, thus affecting the noise reduction effect.

Therefore, the existing silencer has the problem of poor noise reduction effect because the silencer cannot cope with the noises with different frequencies.

SUMMARY

The present disclosure aims to provide a turbocharger air intake silencer with an adjustable cavity space structures so as to solve the problem of poor noise reduction effect since the existing silencer cannot cope with noises with different frequencies.

The purpose of the present disclosure is realized as follows.

Disclosed is a turbocharger air intake silencer with an adjustable cavity space structure. The turbocharger air intake silencer includes a silencer connecting flange and a first resonator device. The first resonator device includes a first silencer sealing plate, a first annular sound absorption cavity body, a first rotary table, a first rotary steering gear and a first valve. A first sound absorption cavity is enclosed by the first silencer sealing plate, the first annular sound absorption cavity body, the first valve and the first rotary table. A first sound absorption cavity inlet pipe is provided beside the first sound absorption cavity. The first sound absorption cavity and the first sound absorption cavity inlet pipe form a Helmholtz resonator. The first rotary steering gear is mounted on the silencer connecting flange. The first rotary steering gear is connected with a first rotary rack. The first valve, the first rotary table and the first rotary rack are connected to one another.

The present disclosure further has the following characteristics.

Firstly, the first sound absorption cavity inlet pipe includes a large fan-shaped cavity and a small fan-shaped cavity. The large fan-shaped cavity is formed along the radial direction of the first annular sound absorption cavity body. The small fan-shaped cavity is formed on one side of the large fan-shaped cavity. The large fan-shaped cavity communicates with the small fan-shaped cavity. The first valve is mounted in the small fan-shaped cavity.

Secondly, the number of the Helmholtz resonators of the first resonator device is six, and the Helmholtz resonators are uniformly distributed along the circumference of the first annular sound absorption cavity body.

Thirdly, connecting columns are arranged outside and connected to the first annular sound absorption cavity body and the first silencer sealing plate.

Fourthly, the height of the small fan-shaped cavity is one quarter to three quarters of that of the large fan-shaped cavity.

Fifthly, the turbocharger air intake silencer further includes a second resonator device. The second resonator device includes a second silencer sealing plate, a second annular sound absorption cavity body, a second rotary table, a second rotary steering gear and a second valve. A second sound absorption cavity is enclosed by the second silencer sealing plate, the second annular sound absorption cavity body, the second valve and the second rotary table. A second sound absorption cavity inlet pipe is provided beside the second sound absorption cavity. The second sound absorption cavity and the second sound absorption cavity inlet pipe form a Helmholtz resonator. The second rotary steering gear is mounted on the silencer connecting flange. The second rotary steering gear is connected with a second rotary rack. The second valve, the second rotary table and the second rotary rack are connected to one another. The second resonator device is located below the first resonator device, and the connecting column extends to the outside of the second annular sound absorption cavity body and the second silencer sealing plate.

Sixthly, the number of the Helmholtz resonators of the second resonator device is nine, and the Helmholtz resonators are uniformly distributed along the circumference of the second annular sound absorption cavity body.

Seventhly, the turbocharger air intake silencer further includes a third resonator device. The third resonator device includes a third silencer sealing plate, a third annular sound absorption cavity body, a third rotary table, a third rotary steering gear and a third valve. A third sound absorption cavity is enclosed by the third silencer sealing plate, the third annular sound absorption cavity body, the third valve and the third rotary table. A third sound absorption cavity inlet pipe is provided beside the third sound absorption cavity. The third sound absorption cavity and the third sound absorption cavity inlet pipe form a Helmholtz resonator. The third rotary steering gear is mounted on the silencer connecting flange. The third rotary steering gear is connected with a third rotary rack. And the third valve, the third rotary table and the third rotary rack are connected to one another. The third resonator device is located below the second resonator device, and the connecting column extends to the outside of the third annular sound absorption cavity body and the third silencer sealing plate.

Eighthly, the number of the Helmholtz resonators of the third resonator device is twelve, and the Helmholtz resonators are uniformly distributed along the circumference of the third annular sound absorption cavity body.

Ninthly, the second sound absorption cavity is longer than the first sound absorption cavity along the axial direction, and the third sound absorption cavity is longer than the second sound absorption cavity along the axial direction.

The turbocharger air intake silencer has the following advantages. The valve of the sound absorption cavity is a rotating body fixed on the rotary table, and the rotary rotates at a certain angle with the central axis of the silencer as the axis, and the valve of the sound absorption cavity can rotate relative to other structures of the silencer with the rotation of the silencer sealing plate table, so that the cross-sectional area $S_c$ of the sound absorption cavity inlet pipe is changed with the rotation of the inlet pipe valve of the sound absorption cavity. Therefore, the resonance frequency of the Helmholtz resonator is changed, so that the silencer can play a better silencing effect on noises with different frequencies.

DETAILED DESCRIPTION OF THE EMBODIMENTS

Figure 1:
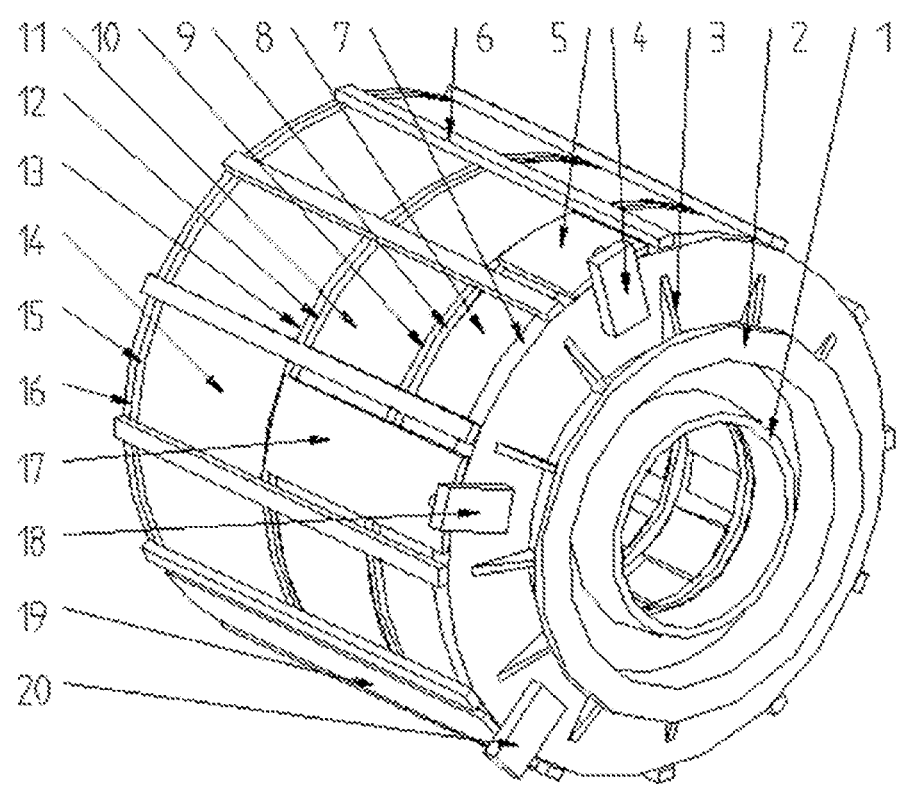
FIG. 1 is a structural schematic diagram of the present disclosure.

The present disclosure is described in more detail with reference to the attached figures.

Referring to FIG. 1 to FIG. 5, a turbocharger air intake silencer structurally includes a silencer air outlet 1, a silencer connecting flange 2, a plurality of reinforcing ribs 3, a first rotary steering gear 4, a first rotary rack 5, a plurality of connecting columns 6, a first silencer sealing plate 7, a first annular sound absorption cavity body 8, a first rotary table 9, a second silencer sealing plate 10, a second annular sound absorption cavity body 11, a second rotary table 12, a third silencer sealing plate 13, a third annular sound absorption cavity body 14, a third rotary table 15, a fourth silencer sealing plate 16, a second rotary rack 17, a second rotary steering gear 18, a third rotary rack 19, a third rotary steering gear 20, a first valve 21, a second valve 22, a third valve 23, a first sound absorption cavity 24, a first sound absorption cavity inlet pipe 25, a second sound absorption cavity 26, a second sound absorption cavity inlet pipe 27, a third sound absorption cavity 28 and a third sound absorption cavity inlet pipe 29.

Figure 3:
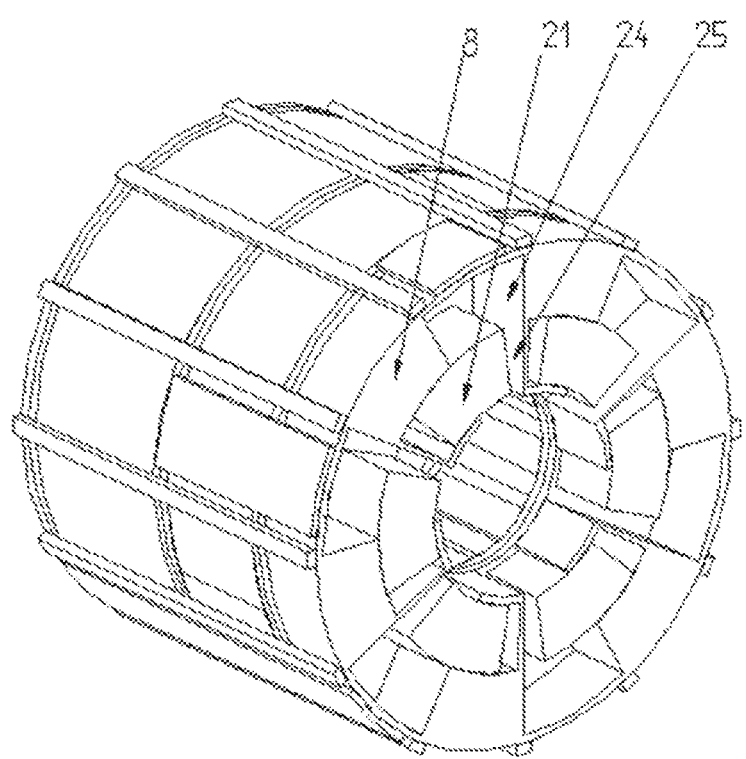
FIG. 3 is an internal structure diagram after a silencer connecting flange 2 is omitted.

The number of resonators of the present disclosure is three. The three resonators are three sound absorption cavities with the adjustable cavity structure, namely the first sound absorption cavity 24, the second sound absorption cavity 26 and the third sound absorption cavity 28. Here, the first sound absorption cavity 24 and FIG. 3 are taken as examples. The silencer is a cylinder as a whole. The number of the first sound absorption cavities 24 uniformly distributed around the circumference of the cylinder is six. The first sound absorption cavity 24 is enclosed by the first silencer sealing plate 7, the first annular sound absorption cavity body 8, the first valve 21 and the first rotary table 9. The first sound absorption cavity 24 and the first sound absorption cavity inlet pipe 25 are combined to form a Helmholtz resonator. The first silencer sealing plate 7 and the first annular sound absorption cavity body 8 are fixed with other silencer sealing plates and annular sound absorption cavities through the connecting columns 6. The number of the connecting columns 6 uniformly distributed around the circumference of the cylinder is twelve. The connecting columns 6 play the roles of connecting and fixing the silencer sealing plates and the annular sound absorption cavities and limiting the radial positions of the rotary tables.

Figure 4:
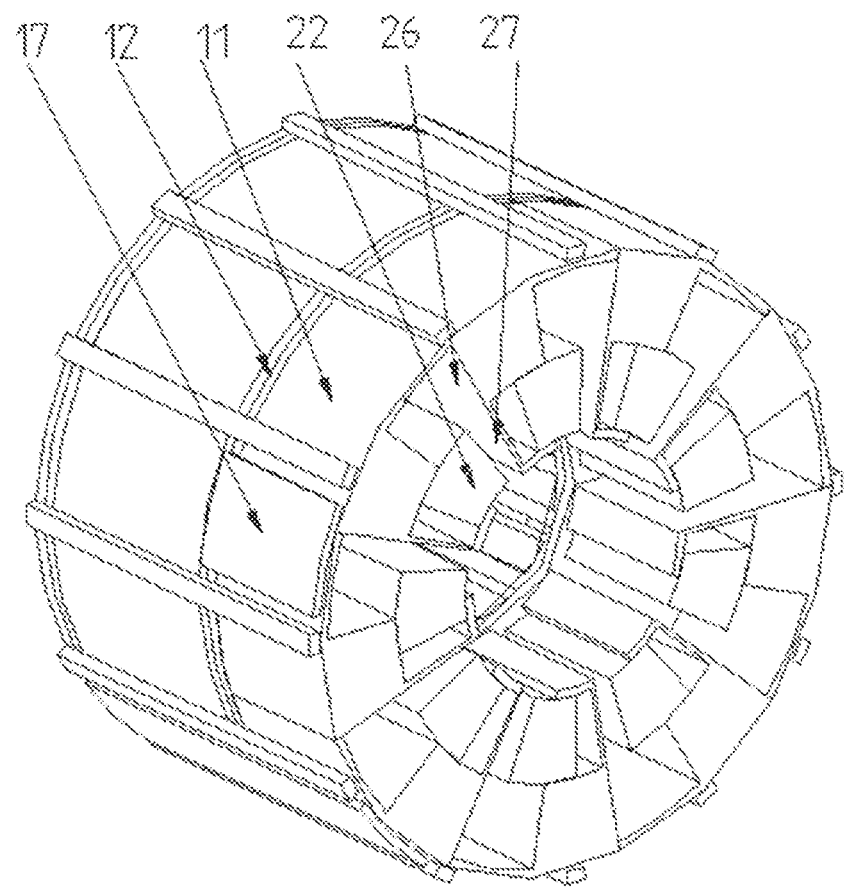
FIG. 4 is an internal structure diagram when the number of resonators is two in the present disclosure.
Figure 5:
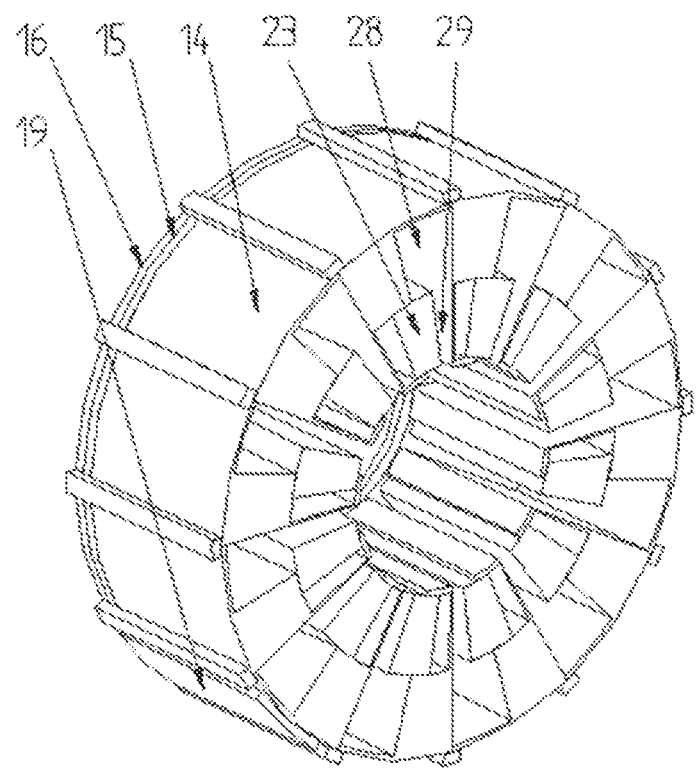
FIG. 5 is an internal structure diagram when the number of resonators is one in the present disclosure.

The first annular sound absorption cavity body 8 and the first valve 21 are approximately fan-shaped. The first annular sound absorption cavity body 8 is fixed with the first silencer sealing plate 7. The first valve 21 is fixed with the first rotary table 9 and the first rotary rack 5. Thus, when the first rotary steering gear 4 operates, the first rotary table 9 and the first valve 21 can be driven to rotate around the central axis of the silencer together by driving the rotation of the first rotary rack 5, so that the cross-sectional area of the first sound absorption cavity inlet pipe 25 is changed, thus changing the resonance frequency of the Helmholtz resonator. The second sound absorption cavity 26 and the third sound absorption cavity 28 are of similar structures to that of the first sound absorption cavity 24, so details are not be repeated here. The difference is that the cavity volumes of the three sound absorption cavities are different. The lengths along the axial direction are different, and the numbers of the sound absorption cavities uniformly distributed along the circumferential direction are different. As shown in FIG. 4, the second sound absorption cavity 26 is slightly longer along the axial direction than the first sound absorption cavity 24, and nine second sound absorption cavity 26 are uniformly distributed along the circumference. As shown in FIG. 5, the length of the third sound absorption cavity 28 along the axial direction is slightly longer than the second sound absorption cavity 26, and twelve third sound absorption cavities 28 are uniformly distributed along the circumference.

The silencer structure is externally connected with a control unit. The control unit monitors the rotating speed of an impeller in a turbocharger in real time, judges the frequency of currently generated aerodynamic noise according to the rotating speed, and rotates the rotary rack, the rotary table and the valve according to the frequency of the noise. The relative positions of the valve and the annular sound absorption cavity body and the cross-sectional area of the sound absorption cavity inlet pipe are changed, so that the resonance frequency of the Helmholtz resonator in the silencer adapts to the frequency of the currently generated aerodynamic noise, thus achieving a better silencing effect.

As shown in FIG. 3 to FIG. 5, six Helmholtz resonator structures, nine Helmholtz resonator structures and twelve Helmholtz resonator structures are distributed along the circumferential direction respectively. In the specific implementation process, the number is not fixed, and the number of the Helmholtz resonator structures can be adjusted according to the specific size and processing difficulty of the silencer.

As shown in FIG. 3, the six Helmholtz resonator structures distributed along the circumferential direction are of the same size and are uniformly distributed. In the specific implementation process, the size and distribution of the Helmholtz resonators can be adjusted, and the volume of the sound absorption cavity of each Helmholtz resonator can be designed to cope with noise with different frequencies.

Without restriction on the materials of the inner wall of the sound absorption cavity and the inlet pipe valve of the sound absorption cavity, and the sound absorption cavity can be made of materials that are convenient to process, or can be made of sound absorption materials to further strengthen the sound absorption performance of the silencer.

Figure 2:
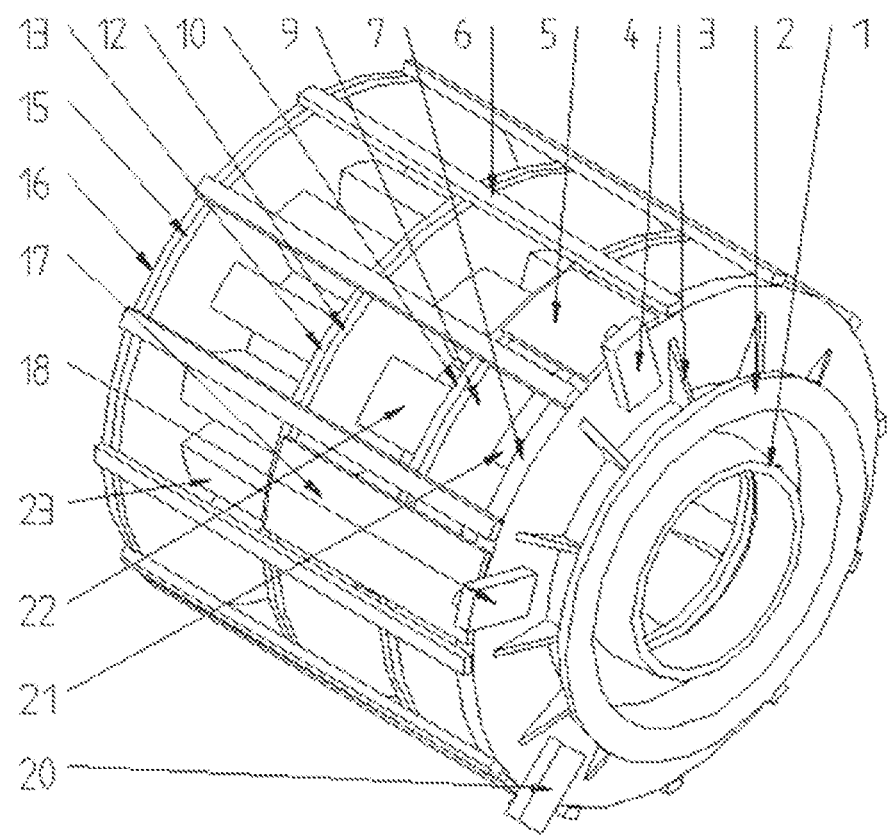
FIG. 2 is a diagram of a rotating mechanism in the present disclosure.

As shown in FIG. 1 and FIG. 2, in order to make the valve rotate, the steering gear as shown in the figure is used for driving the valve to rotate. In the specific implementation process, the way of driving the rotary table to rotate is not fixed and can be adjusted according to the actual situation.

As shown in FIG. 1, the silencer includes three sound absorption structures. Each sound absorption structure includes a first sound absorption cavity 24, a second sound absorption cavity 26 and a third sound absorption cavity 28 respectively. In the specific implementation process, the structure is not fixed, and can be adjusted according to the type of noise. The silencer can include only two or fewer sound absorption structures or four or more sound absorption structures.

As shown in FIG. 1 to FIG. 5, the working principle of the present disclosure is described as follows.

The main structure of the silencer is an annular sound absorption cavity body with an adjustable cavity structure, wherein each sound absorption cavity inlet is a sound absorption unit, and a plurality of sound absorption units are uniformly distributed along the circumference. The valve is a rotating body fixed on the rotary table, and the rotary rotates at a certain angle with the central axis of the silencer as the axis, and the valve can rotate relative to other structures of the silencer with the rotation of the rotary table, so that the cross-sectional area of the sound absorption cavity inlet pipe is changed with the rotation of the inlet pipe valve of the sound absorption cavity. When the cross-sectional area of the sound absorption cavity inlet is changed, the overall structure of the sound absorption unit is changed to some extent, thus playing a role in adjusting the frequency of noise that the silencer adapts to.

When the turbocharger air intake silencer with the adjustable cavity space structure works, air flow enters the silencer through the silencer inlet, then enters a turbocharger along the axial direction through the cavity in the center of the silencer. when the air flow flows along the axial direction, the air flow passes through the inlet pipes of the sound absorption cavities inside the silencer and flows into the cavities of the sound absorption cavities through the inlet pipes. The circumferentially distributed sound absorption cavities and the inlet pipes form a simple Helmholtz resonator, thus playing a role in reducing low-frequency noise. When the frequency of the noise reaches the resonance frequency of the Helmholtz resonator, the transmission loss reaches infinity, and the resonance frequency of the Helmholtz resonator can change with the change of the structural parameters.

The resonance frequency of the Helmholtz resonator is as follows.

$$f_r = \frac{c}{2\pi}\sqrt{\frac{S_c}{l_c V}}$$

Wherein, c is sound velocity, V is the volume of the sound absorption cavity, $S_c$ is the cross-sectional area of the sound absorption cavity inlet pipe, $l_c$ is the length of the sound absorption cavity inlet pipe. Obviously, the resonance frequency of the Helmholtz resonator is a function of the volume of the sound absorption cavity, and the length and the cross-sectional area of the inlet pipe. The resonance frequency is directly proportional to the square root of the cross-sectional area of the inlet pipe, and inversely proportional to the square root of the length of the inlet pipe and the square root of the volume of the sound absorption cavity.

In the first embodiment, the turbocharger air intake silencer includes a silencer outlet 1, a silencer connecting flange 2, a plurality of connecting columns and a plurality of resonators. The silencer outlet 1 is mounted at the end of the silencer connecting flange 2, and the resonators are all cylinders and sequentially mounted along the axis of the silencer connecting flange 2 through a plurality of connecting columns. Each resonator is provided with a sound absorption cavity, and the volume of the sound absorption cavity is adjustable. The volumes of the sound absorption cavities of every two adjacent resonators are different.

In the embodiment, the volume-adjustable resonator provided with a plurality of annular sound absorption cavity body is used for coping with noises with different frequencies, so that the noise reduction effect is poor.

In the second embodiment, referring to FIG. 1 to FIG. 5, each resonator includes a rotary steering gear, a rack, an annular sound absorption cavity body, a plurality of valves, a rotary table and a silencer sealing plate.

The rotary steering gear is mounted on the silencer connecting flange 2. A plurality of sound absorption cavity inlets are formed in the inner wall of the annular sound absorption cavity body. A valve is mounted in each sound absorbing absorption inlet. A rotary table and a silencer sealing plate are sequentially mounted on the side end face of the annular sound absorption cavity body. The valve is connected with the rotary table. A rack is mounted on the annular sound absorption cavity body and engages with the rotary table. The rotary steering gear is connected with the rack, and the valve rotates under the synergistic action of the rotary steering gear and the rack to realize the change of the volume of the sound absorption cavity inlet.

In this way, the structure is a single resonator structure. The valve is fixed on the silencer sealing plate. The rotary table is driven by rotating the steering gear and the rack. The cross-sectional area of the sound absorption cavity inlet pipe is changed through the position of the valve at the inlet of the sound absorption cavity, and then noises with different frequencies are reduced. Other constituting and connecting relationships are the same as those in the first embodiment.

In the third embodiment, referring to FIG. 1 to FIG. 5, a plurality of sound absorption cavity inlets at equal intervals along the circumferential direction are formed in the inner side wall of the annular sound absorption cavity body. In this way, noise is convenient to enter the silencer. Other constituting and connecting relationships are the following same as those in the first or second embodiment.

In the fourth embodiment, referring to FIG. 1 to FIG. 5, the sound absorption cavity inlet pipe includes a large fan-shaped cavity and a small fan-shaped cavity. The large fan-shaped cavity is formed along the radial direction of the first annular sound absorption cavity body. The small fan-shaped cavity is formed on one side of the large fan-shaped cavity. The large fan-shaped cavity communicates with the small fan-shaped cavity. The valve is mounted in the small fan-shaped cavity. In this way, the small fan-shaped cavity is used for mounting the valve, and the large fan-shaped cavity is used for noise entry and silencing. Other constituting and connecting relationships are the same as those in any of the first embodiment to the third embodiment.

In the fifth embodiment, referring to FIG. 3 to FIG. 5, the height of the small fan-shaped cavity is one quarter to three quarters of that of the large fan-shaped cavity. In this way, small fan-shaped cavities of different sizes are selected according to actual needs, so that the height and size of the valve are adjusted. Other constituting and connecting relationships are the same as those in any of the first embodiment to the fourth embodiment.

In the sixth embodiment, referring to FIG. 3 to FIG. 5, the valve is a fan-shaped valve, and the valve is fixedly mounted on the rotary table. In this way, the valve is matched with the small fan-shaped cavity. Other constituting and connecting relationships are the same as those in any of the first embodiment to the fifth embodiment.

In the seventh embodiment, referring to FIG. 3 to FIG. 5, the silencer sealing plate is an annular sealing plate. In this way, the valve is fixed. Other constituting and connecting relationships are the same as those in any of the first embodiment to the sixth embodiment.

In the eighth embodiment, referring to FIG. 3 to FIG. 5, the number of the resonators is two to five. In this way, an appropriate number of resonators are selected according to the actual situation to meet the silencing requirement. Other constituting and connecting relationships are the same as those in any of the first embodiment to the seventh embodiment.

In the ninth embodiment, referring to FIG. 3 to FIG. 5, the axial lengths of the resonators are all different. In this way, a better silencing effect is achieved for noises with different frequencies. Other constituting and connecting relationships are the same as those in any of the first embodiment to the eighth embodiment.

In the tenth embodiment, referring to FIG. 3 to FIG. 5, the silencer further includes a plurality of reinforcing ribs 3. The reinforcing ribs 3 are mounted on the side wall of the outer circumference of the silencer connecting flange 2 in an annular array. In this way, the overall strength of the whole silencer is improved. Other constituting and connecting relationships are the same as those in any of the first embodiment to the ninth embodiment.

What is claimed is:

1. A turbocharger air intake silencer with an adjustable cavity space structure, comprising a silencer connecting flange and a first resonator device, wherein the first resonator device comprises a first silencer sealing plate, a first annular sound absorption cavity body, a first rotary table, a first rotary steering gear and a first valve,
    a first sound absorption cavity is enclosed by the first silencer sealing plate, the first annular sound absorption cavity body, the first valve and the first rotary table, a first sound absorption cavity inlet pipe is provided beside the first sound absorption cavity, and the first sound absorption cavity and the first sound absorption cavity inlet pipe form a Helmholtz resonator,
    the first rotary steering gear is mounted on the silencer connecting flange, the first rotary steering gear is connected with a first rotary rack, and the first valve, the first rotary table and the first rotary rack are connected to one another; and
    the first sound absorption cavity inlet pipe comprises a large fan-shaped cavity and a small fan-shaped cavity, the large fan-shaped cavity is formed along a radial direction of the first annular sound absorption cavity body, the small fan-shaped cavity is formed on one side of the large fan-shaped cavity, the large fan-shaped cavity communicates with the small fan-shaped cavity, and the first valve is mounted in the small fan-shaped cavity.

2. The turbocharger air intake silencer with the adjustable cavity space structure according to claim 1, wherein the number of the Helmholtz resonators of the first resonator device is six, and the Helmholtz resonators are uniformly distributed along a circumference of the first annular sound absorption cavity body.

3. The turbocharger air intake silencer with the adjustable cavity space structure according to claim 1, wherein connecting columns are arranged outside and connected to the first annular sound absorption cavity body and the first silencer sealing plate.

4. The turbocharger air intake silencer with the adjustable cavity space structure according to claim 1, wherein a height of the small fan-shaped cavity is one quarter to three quarters of that of the large fan-shaped cavity.

5. The turbocharger air intake silencer with the adjustable cavity space structure according to claim 1, further comprising a second resonator device, wherein the second resonator device comprises a second silencer sealing plate, a second annular sound absorption cavity body, a second rotary table, a second rotary steering gear and a second valve,
    a second sound absorption cavity is enclosed by the second silencer sealing plate, the second annular sound absorption cavity body, the second valve and the second rotary table, a second sound absorption cavity inlet pipe is provided beside the second sound absorption cavity, and the second sound absorption cavity and the second sound absorption cavity inlet pipe form a Helmholtz resonator,
    the second rotary steering gear is mounted on the silencer connecting flange, the second rotary steering gear is connected with a second rotary rack, and the second valve, the second rotary table and the second rotary rack are connected to one another; and
    the second resonator device is located below the first resonator device, and the connecting columns extend to the outside of the second annular sound absorption cavity body and the second silencer sealing plate.

6. The turbocharger air intake silencer with the adjustable cavity space structure according to claim 5, wherein the number of the Helmholtz resonators of the second resonator device is nine, and the Helmholtz resonators are uniformly distributed along a circumference of the second annular sound absorption cavity body.

7. The turbocharger air intake silencer with the adjustable cavity space structure according to claim 5, further comprising a third resonator device, wherein the third resonator device comprises a third silencer sealing plate, a third annular sound absorption cavity body, a third rotary table, a third rotary steering gear and a third valve,
    a third sound absorption cavity is enclosed by the third silencer sealing plate, the third annular sound absorption cavity body, the third valve and the third rotary table, a third sound absorption cavity inlet pipe is provided beside the third sound absorption cavity, and the third sound absorption cavity and the third sound absorption cavity inlet pipe form a Helmholtz resonator,
    the third rotary steering gear is mounted on the silencer connecting flange, the third rotary steering gear is connected with a third rotary rack, and the third valve, the third rotary table and the third rotary rack are connected to one another; and the third resonator device is located below the second resonator device, and the connecting columns extend to the outside of the third annular sound absorption cavity body and the third silencer sealing plate.

8. The turbocharger air intake silencer with the adjustable cavity space structure according to claim 7, wherein the number of the Helmholtz resonators of the third resonator device is twelve, and the Helmholtz resonators are uniformly distributed along a circumference of the third annular sound absorption cavity body.

9. The turbocharger air intake silencer with the adjustable cavity space structure according to claim 7, wherein the second sound absorption cavity is longer than the first sound absorption cavity along an axial direction, and the third sound absorption cavity is longer than the second sound absorption cavity along the axial direction.

\* \* \* \* \*